United States Patent

[11] 3,576,213

[72] Inventor David B. Hall
Newburg, N. Dak. 58762
[21] Appl. No. 806,356
[22] Filed Mar. 12, 1969
[45] Patented Apr. 27, 1971

[54] FARM IMPLEMENT
5 Claims, 7 Drawing Figs.
[52] U.S. Cl. ..................................................... 172/44,
172/484
[51] Int. Cl. .................................................... A01b 39/19,
A01b 63/00
[50] Field of Search ........................................... 172/44,
484, 452

[56] References Cited
UNITED STATES PATENTS
| | | | |
|---|---|---|---|
| 2,954,085 | 9/1960 | Roberts ....................... | 172/44 |
| 3,140,678 | 7/1964 | Morris ......................... | 172/44X |
| 3,209,841 | 10/1965 | VanDerlely et al. .......... | 172/484X |
| 3,360,053 | 12/1967 | Doepker ...................... | 172/44 |
| 3,422,908 | 1/1969 | Blake .......................... | 172/44X |

Primary Examiner—Robert E. Pulfrey
Assistant Examiner—Stephen C. Pellegrino
Attorney—Gravely, Lieder & Woodruff ABSTRACT: A farm implement having a frame which carries a cultivator and a rod weeder assembly, the latter including a weeder rod which is drawn through the soil loosened by the former. The height of the cultivator relative to the ground is variable, while the height of the weeder rod is variable relative to the cultivator. Consequently, the cultivator may be used independently of the rod weeder assembly.

PATENTED APR 27 1971

INVENTOR:
DAVID B. HALL
BY
Gravely, Lieder & Woodruff
ATTORNEYS.

PATENTED APR 27 1971 3,576,213

INVENTOR:
DAVID B. HALL
BY Gravely, Lieder & Woodruff
ATTORNEYS.

FARM IMPLEMENT

This invention relates in general to farm implements and more particularly to a combination cultivator and rod weeder.

Broadly speaking, a rod weeder includes a weeder rod which revolves backwardly as it is drawn through a field a few inches below the surface of the soil. The rod engages weeds and clods and lifts them to the surface or otherwise destroys them. Heretofore weeder rods have been preceded on a single implement by cultivator chisels, but the sole purpose of the chisels has been to loosen the soil to facilitate passage of the weeder rod through it. Moreover, rod weeders operate most effectively when their weeder rods run as shallow as possible. However, the chisels and weeder rods of conventional rod weeders are not adjustable relative to one another, and consequently the depth of the weeder rod cannot be adjusted with sufficient preciseness to provide the most effective weed eradication.

One of the principal objects of the present invention is to provide a farm implement which can be used either as a cultivator or as a rod weeder. Another object is to provide an implement of the type stated in which cultivator components thereof loosen the soil to facilitate passage of a weeder rod through the soil. A further object is to provide an implement of the type stated in which the heights of the weeder rod and the cultivator above the ground as well as relative to one another are variable. Still another object is to provide an implement of the type stated in which the depth of the weeder rod can be controlled with extreme preciseness.

These and other objects and advantages will become apparent hereinafter.

The present invention is embodied in a farm implement including a cultivator and a rod weeder assembly having a weeder rod. The heights of the cultivators and weeder rod are adjustable relative to the ground and relative to one another.

The invention also consists in the parts and in the arrangements and combinations of parts hereinafter described and claimed. In the accompanying drawings which form part of the specification and wherein like numerals and letters refer to like parts wherever they occur:

Figure 1:
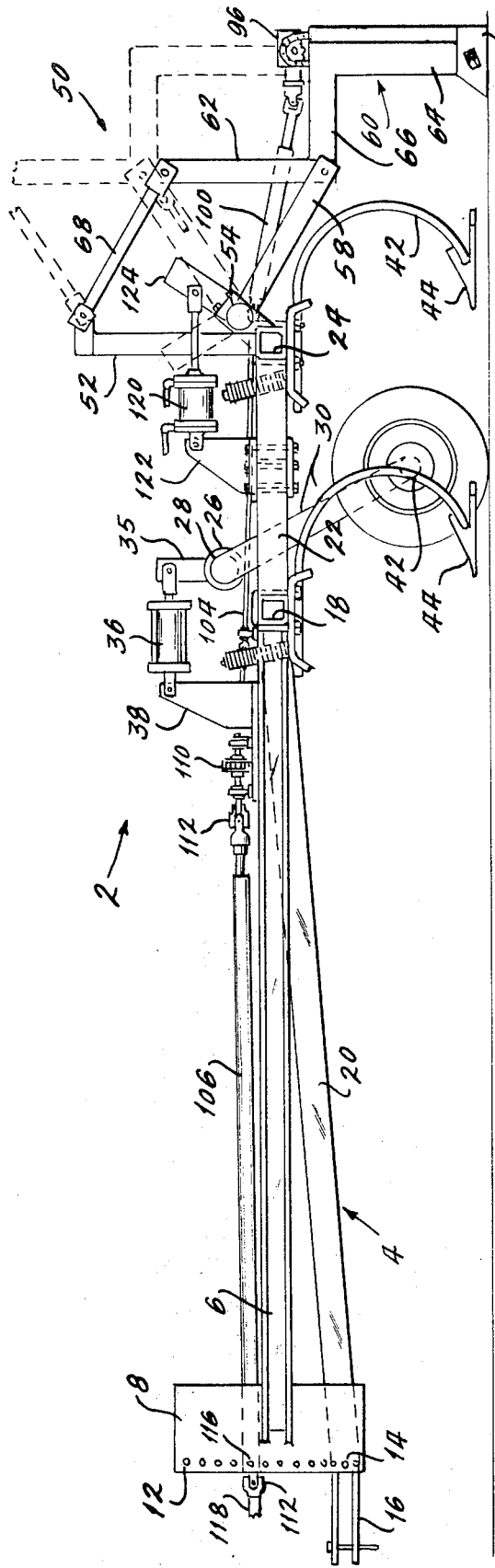
FIG. 1 is a side elevational view of a farm implement constructed in accordance with and embodying the present invention.

Referring now in detail to the drawings, 2 designates a farm implement adapted to be drawn by a tractor and including a main frame 4 having a pair of forwardly converging side beams 6 which at their forward ends are welded to a pair of vertical hitch plates 8 located in spaced parallel relation to one another. The plates 8 have pairs of horizontally aligned but vertically spaced apertures 12 for acceptance and retention of a pin 14 which also extends through a hitch clevis 16 located intermediate the plates 8. The hitch clevis 16 is adapted for connection to a mating hitch on a tractor (not shown). At their rear ends the side beams 6 are welded to a forward crossbeam 18, and extending forwardly from the midportion of the crossbeam 18 is an intermediate beam 20 which forwardly terminates between and is welded to the hitch plates 8 below the side beams 6, thereby serving as a spacer for maintaining the plates 8 in spaced relation. The frame 4 further includes a plurality of parallel end beams 22 which are welded to the project rearwardly from the forward crossbeam 18, the rear ends of the end beams 22 being traversed by a rear crossbeam 24 located parallel to the forward crossbeam 18.

Figure 2:
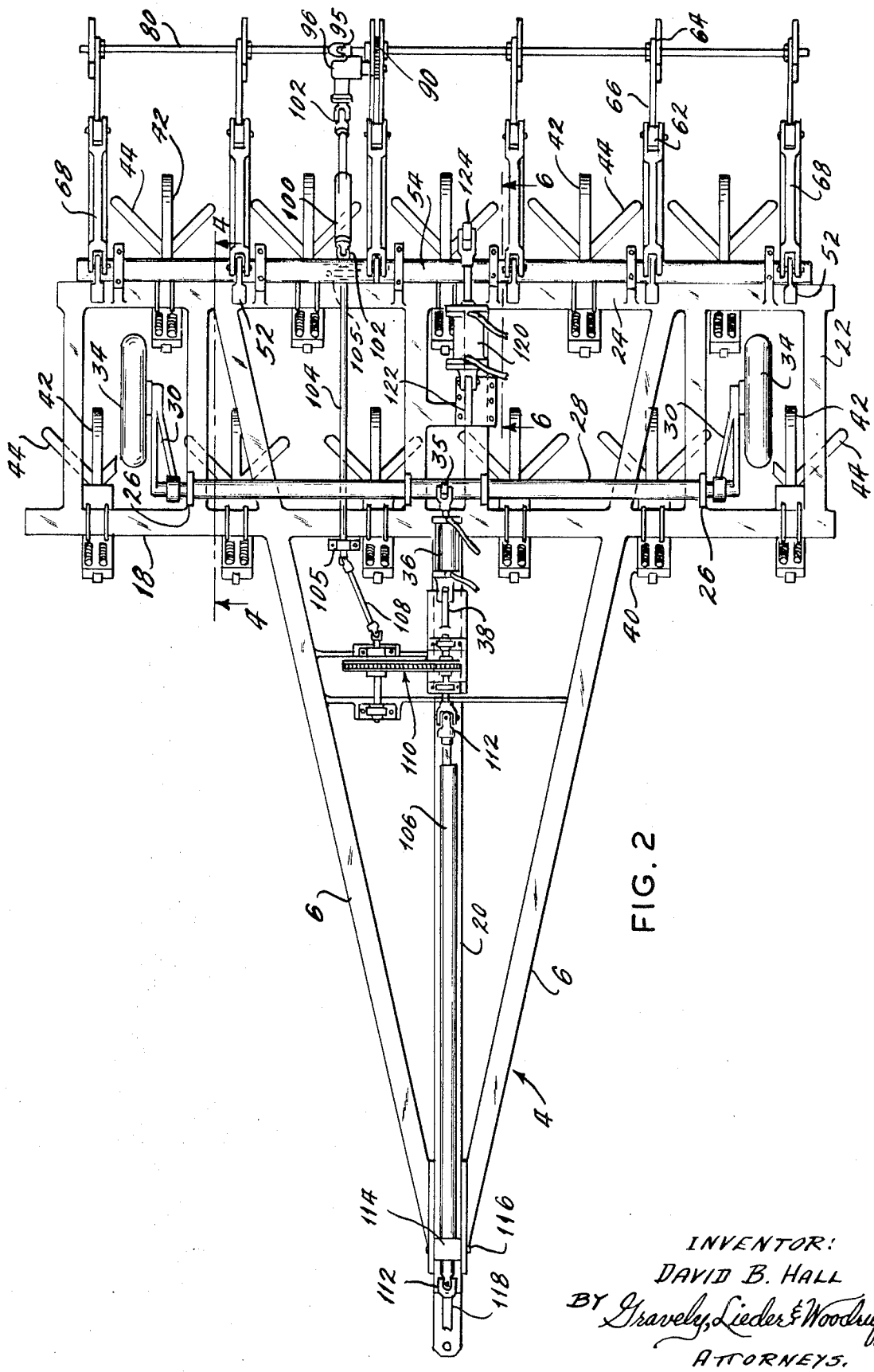
FIG. 2 is a top plan view of the farm implement.
Figure 4:
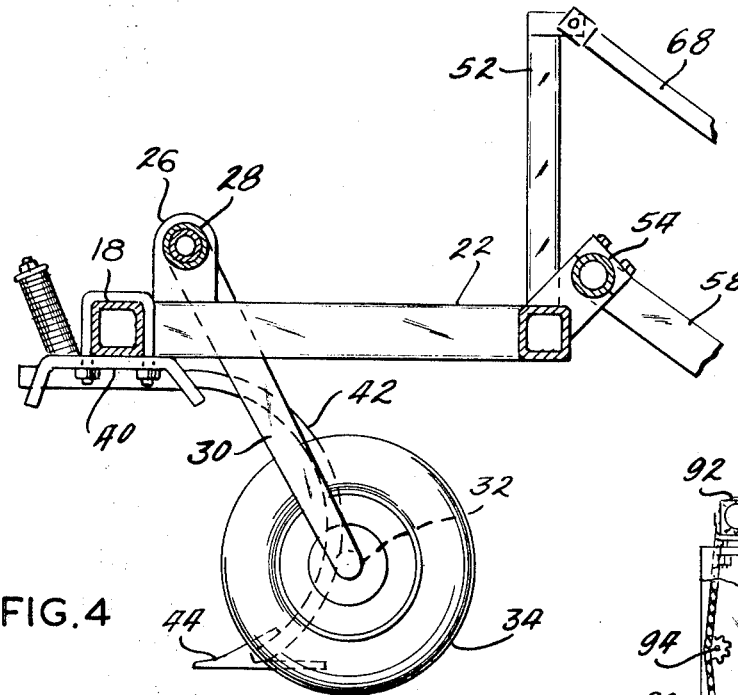
FIG. 4 is a sectional view taken along line 4—4 of FIG. 2.

To the rear of the forward crossbeam 18 several of the end beams 22 are provided with upwardly presented pillow blocks 26 in which a forward rockshaft 28 is journaled (FIGS. 1, 2 and 4). At its ends the rockshaft 28 is rigidly fitted with downwardly and rearwardly extending suspension arms 30 which terminate at laterally projecting spindles 32 having ground engaging wheels 34 journaled on them. Between the arms 30 the forward rockshaft 28 is provided with an upwardly projecting actuating arm 35 to which the piston rod of a hydraulic cylinder 36 is pinned, the barrel of the cylinder 36 being pinned to a mounting arm 38 which projects upwardly from and for purposes of adjustment is bolted to the intermediate beam 20. When the piston rod of the cylinder 36 retracts it rotates the rockshaft 28 such that the angle between the arms 30 and the frame 4 is decreased, and this lowers the frame 4 toward the ground. Conversely, when the piston of the cylinder 36 extends the frame 4 rises.

Both the forward beam 18 and the rear crossbeam 24 are fitted at spaced intervals with brackets 40 (FIG. 4) from which cultivator shanks 42 curve rearwardly and then downwardly, terminating at forwardly projecting cultivator sweeps 44. The cultivator shanks 42 on the rear crossbeam 24 are staggered with respect to the shanks 42 on the forward crossbeam 18 so that all of the soil underlying the frame 4 will be turned or otherwise loosened when the cultivator sweeps 44 are allowed to penetrate the soil (FIG. 2). The height of the sweeps 44 above or below the surface of the ground is controlled by the cylinder 36 as previously noted. The brackets 40, shanks 42, and sweeps 44 are conventional and will not be described in further detail.

Figure 3:
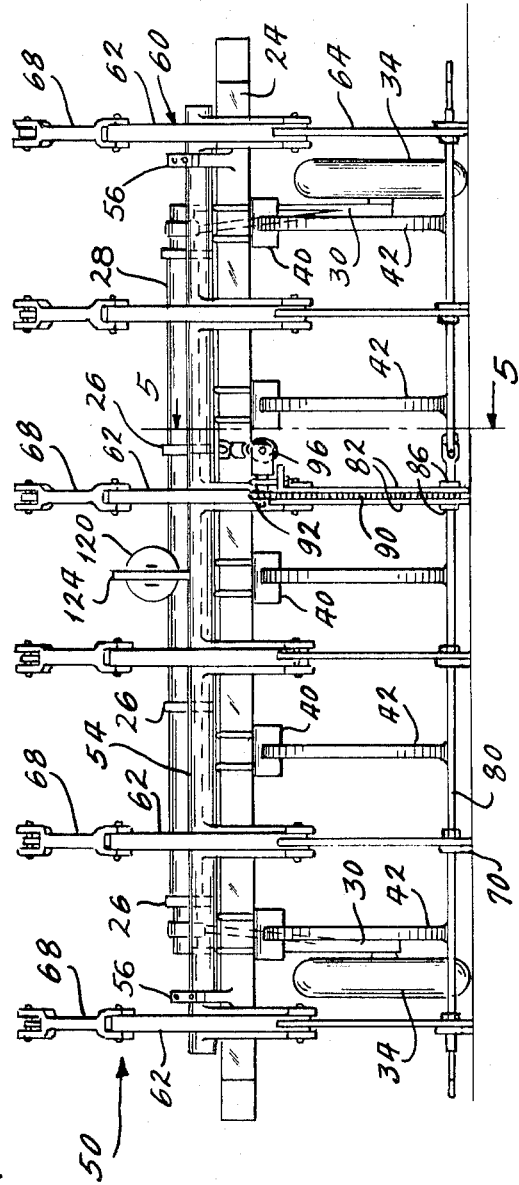
FIG. 3 is an end elevational view of the implement.

In addition to the cultivator shanks 44 the frame 4 is further provided with a rod weeder assembly 50 (FIGS. 1—3) including a plurality of upright standards 52 which are welded to the rear crossbeam 24 and a rear rockshaft 54 which is journaled in pillow blocks 56 located on the rear crossbeam 24 at the lower ends of the upright standards 52. At the base of each standard 52 a lift arm 58 is welded to and projects rearwardly from the rear rockshaft 54 and each lift arm 58 is pinned at its opposite end at a rod weeder shank 60 having a dogleg configuration. In particular, each rod weeder shank 60 includes a vertical upper portion 62 which is substantially the same length as the upright standard 52, a vertical lower portion 64 which is rearwardly offset from the upper portion 62, and a horizontal connecting portion 66 interconnecting the upper and the lower portions 62 and 64. The lift arms 58 are pinned to the rod weeder shanks 60 at the juncture of the upper vertical and horizontal connecting portions 62 and 66 thereon, and at their upper ends the upper portions 62 and the upright standards 52 are pinned to upper connecting bars 68 located parallel to the lift arms 58. The upright standards 52, the lift arms 58, the upper vertical portions 62 of the rod weeder shanks 60, and the upper connecting bars 68, in effect, form a pantograph or parallel linkage arrangement for maintaining the lower vertical portions 64 of the rod weeder shanks 60 generally perpendicular to the ground, irrespective of the inclination of the lift arms 58 which determines the height of the rod weed shanks 60 relative to the ground.

Figure 7:
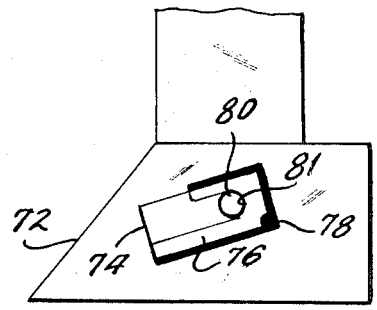
FIG. 7 is an enlarged elevational view of a shoe on the lower end of a rod weeder shank.

At their lower ends the lower vertical portions 64 of the rod weeder shanks 60 are provided with shoes 70 (FIG. 7) having rearwardly inclined leading faces 72. All but one of the shoes have generally rectangular cutouts 74 into which hardwood boxing 76 is fitted, the boxing 76 being oil impregnated and retained within the shoes 70 by straps 78. The boxing 76 does not completely fill the cutout 74 and those portions of the cutouts 74 not occupied by the boxing 76 receive a weeder shaft or rod 80 which extends transversely across the entire rod weeder assembly 50. Each boxing 76 is further provided with an arcuate leading face 81 against which the surface of the weeder rod 80 bears when a rearwardly directed force is applied to it such as when the lower ends of the rod weeder shanks 60 are lowered into and drawn through the ground. In other words, the leading faces 81 on the boxing 76 serve as bearing faces for the weeder rod 80.

Figure 5:
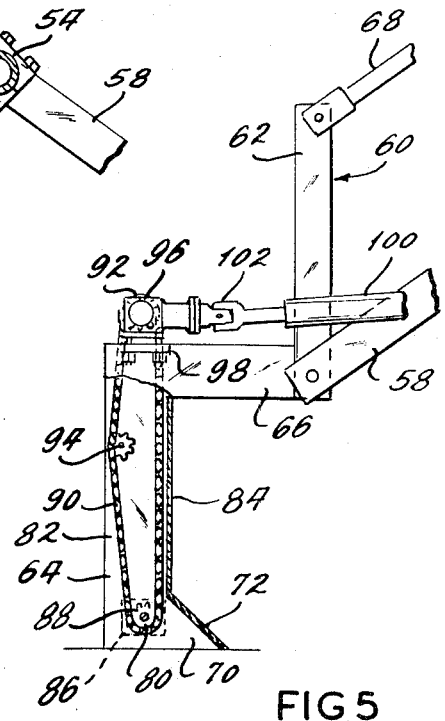
FIG. 5 is a sectional view taken along line 5—5 of FIG. 3.

The lower vertical portion 64 of one of the centrally disposed rod weeder shanks 60 (FIGS. 3 and 5) consists of a pair of spaced side plates 82 interconnected by a forwardly presented bight portion 84, all of which merge at their lower ends into an integrally formed shoe 70, the inclined leading face 72 of which is a continuation of the bight portion 84. That shoe 70 in lieu of hardwood boxing 74 has a pair of bearing blocks 86 bolted against its side plates 82, and the bearing blocks 86 serve as a journal for the center portion of the weeder rod 80. Within the shoe 70 in the space intermediate the side plates 82, a sprocket 88 is keyed to the weeder rod 80, and trained over the sprocket 80 is a drive chain 90 which extends upwardly between the side plates 82 and is trained over another sprocket 92 at the upper end of that lower portion 64. The slack within the chain may be adjusted at an idler sprocket 94 located on the plates 82. On one side of the rod weeder shank 60 containing the drive chain 90 a universal joint 95 is interposed on the weeder rod 80 to reduce fatigue stresses during operation.

The upper sprocket 92 over which the drive chain 90 is trained is keyed to the output shaft of a gear box 96 which affords a right-angle transfer of power and is bolted to a mounting bracket 98 affixed to one of the side plates 82. The input shaft of the gear box 96 is connected to a telescopic shaft 100 through a universal joint 102 (FIG. 2), the opposite end of the telescopic shaft 100 being connected through another universal joint 102 to a drive shaft 104 which is journaled in pillow blocks 105 bolted to the forward and rear crossbeams 18 and 24, respectively. The drive shaft 104 in turn is connected to a centrally located main drive shaft 106 through a connecting shaft 108 and a chain and sprocket drive reduction 110, all of which are mounted on the main frame 4 forwardly from the forward crossbeam 18. The main drive shaft 106 is located above the intermediate beam 20 and is provided with universal joints 112 at each end. The forward end of the main drive shaft 106 is furthermore journaled in a pillow block 114 mounted between the vertical hitch plates 8 by means of a removable bolt 116 fitted through a pair of aligned apertures 12. Thus, the height of the forward end of the drive shaft 106, like the clevis 16, may be altered. Beyond the pillow block 114 the main drive shaft 106 is connected to a power takeoff shaft 118 adapted for connection to the power takeoff unit of a tractor (not shown).

Figure 6:
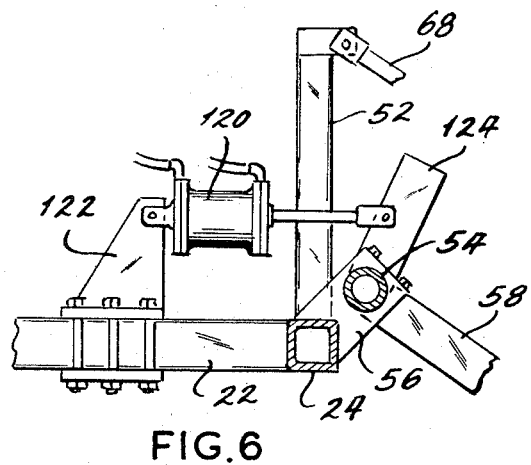
FIG. 6 is a sectional view taken along line 6—6 of FIG. 2.

The rod weeder assembly 50 further includes a hydraulic cylinder 120 (FIG. 6) having its barrel pinned to a mounting arm 122 projecting upwardly from one of the end beams 22 and its piston rod pinned on actuating arm 124 welded to the rear rock shaft 54. As the piston rod retracts into the barrel of the hydraulic cylinder 120 it draws the actuating arm 124 forwardly and rotates the rear rockshaft 54 such that its lift arms 58 are raised upwardly. This in turn raises the rod weeder shanks 60, and by reason of the parallel linkage arrangement formed by the standards 52, the lift arms 58, the upper vertical portions 62, and the upper connecting bars 68, the lower vertical portions 64 of the rod weeder shanks 60 will also rise, yet will remain generally perpendicular to the ground. When the piston rod of the cylinder 120 extends the rod weeder shanks 60 are, of course, lowered.

The barrels of the hydraulic cylinders 36 and 120 are connected by hydraulic lines to the hydraulic control unit (not shown) on the tractor.

In operation the farm implement 2 is connected to a tractor at its hitch clevis 16 and thereafter the power takeoff unit on the tractor connected in the conventional manner to the power takeoff shaft 118. Similarly the hydraulic control unit on the tractor is connected by means of conventional couplings (not shown) to the hydraulic lines leading to the hydraulic cylinders 36 and 120. The farm implement 2 is towed to the field to be worked with both the cultivator shanks 42 and rod weeder shanks 60 raised above the ground, and this is achieved by extending the cylinder 36 and retracting the cylinder 120. In other words, the actuating arm 35 on the forward rockshaft 28 is rotated rearwardly so as to increase the angle between the suspension arms 30 and the frame 4 and this, of course, raises the frame 4 high enough so that the cultivator shanks 42 will be presented entirely above the ground. Similarly, the actuating arm 124 on the rear rockshaft 54 is rotated forwardly, and this raises the lift arms 58 and the rod weeder shanks 60 pinned to them.

When it is desired to merely cultivate the field, the hydraulic cylinder 120 is retained in its retracted position holding the lift arms 58 upwardly, but the hydraulic cylinder 36 is retracted somewhat bringing the actuating arm 35 on the rockshaft 28 forwardly. This lowers the frame 4 toward the ground and along with it the cultivator shanks 42. When the sweeps 44 achieve the proper penetration into the ground, the hydraulic lines to the cylinder 36 are blocked so as to maintain that penetration as the implement 2 is towed across the field.

When it is desired to rid the field of weeds, the sweeps 44 on the cultivator shanks 42 are lowered into the ground as previously described, and after the desired penetration is achieved, the rod weeder shanks 60 are also lowered until the weeder rod 80 is presented a few inches below the surface of the soil loosened by the sweeps 44 on the cultivator shanks 42. This is accomplished by extending the hydraulic cylinder 120 and thereby rotating the actuating arm 124 rearwardly. The actuating arm 124 in turn rotates the rear rockshaft 54 and brings the rear ends of the lift arms 58 attached to it downwardly. Since the rod weeder shanks 60 are connected to the rear ends of the lift arms 58 they too will move downwardly. The parallel linkage or pantograph arrangement formed by the rigid upright standards 52 and the movable lift arms 58, vertical upper portions 62, and connecting bars 68 will maintain the lower portions 64 of the rod weeder shanks 60 rigid and vertical irrespective of the angular disposition of the lift arms 58. The universal joints 102 and the telescopic construction of the telescopic drive shaft 100 permit the transfer of power to the right-angle gear box 96 and weeder rod 80 in any vertical position of the rod weeder shanks 60.

As the farm implement 2 is drawn across a field with both its cultivator shanks 42 and its rod weeder shanks 60 lowered into ground, the weeder rod 80, rotating reversely to the direction of travel, that is in the opposite direction from the wheels 34, will uproot weeds and lift them to the surface or otherwise destroy them. The inclined leading faces 72 of the shoes 70 spread the soil previously loosened by cultivator shanks 42 and sweeps 44 for the passage of the lower ends of the rod weeder shanks 60 through it. The hardwood boxing 76 impregnated with oil serve as journals for the rotating rod 80.

Inasmuch as the depth of the weeder rod 80 is adjustable relative to the depth of the cultivator sweeps 44, the penetration of the weeder rod 80 into the soil may be controlled with extreme preciseness. Thus, it is possible to run the weeder rod 80 at extremely shallow depths, irrespective of the condition or consistency of the soil, and thereby achieve the most effective weed eradication.

This invention is intended to cover all changes and modifications of the example of the invention herein chosen for purposes of the disclosure which do not constitute departures from the spirit and scope of the invention.

I claim:

1. A farm implement for working soil; said implement comprising a frame; cultivator means on the frame for loosening the soil; height-adjusting means on the frame for altering the height of the cultivator means with respect to the soil; a plurality of parallel linkage arrangements positioned on the frame, each linkage arrangement including an upright standard mounted rigidly on the frame, a lift arm pivoted relative to the frame at the upright standard, a connecting bar pivotally connected to the standard and presented generally parallel to the lift arm, and a rod weeder shank extending between and pivotally connected to the lift arm and connecting bar at spaced locations, the shank being generally parallel to the upright standard; a weeder rod supported by the rod weeder shank for rotation relative thereto and extending generally transversely of the frame; drive means for rotating the weeder rod and including a first sprocket on the weeder rod at at least one of the rod weeder shanks, a second sprocket on the rod weeder shank at which the first sprocket is located and being located upwardly therefrom, a chain trained over the sprockets, power transfer means on the shank and connected to the second sprocket, and a telescopic drive shaft extending between the power transfer means and the frame; and actuating means connected with the parallel linkage arrangements for pivoting the connecting bars and lifting arms so as to move the rod weeder shanks in a generally vertical direction, whereby the height of the weeder rod relative to the cultivator means is adjusted.

2. A farm implement according to claim 1 wherein the actuating means comprises a rockshaft journaled on the frame adjacent to the upright standards and having the lift arms secured rigidly thereto, and means for rotating the rockshaft so as to change the angular relationship between the frame and lift arms.

3. A farm implement according to claim 1 wherein the means for rotating the rockshaft comprises an actuating arm projecting outwardly from the shaft and a fluid-operated cylinder connected at its one end to the actuating arm and at its opposite end to the frame.

4. A farm implement according to claim 1 wherein the height-adjusting means comprises a rock shaft journaled on the frame, parallel suspension arms extending generally rearwardly and downwardly from the rock shaft, wheels on the lower ends of the suspension arms, and means for rotating the rock shaft.

5. A farm implement according to claim 2 wherein the first height-adjusting means comprises another rock shaft journaled on the frame, parallel suspension arms on the other rock shaft and extending generally rearwardly and downwardly therefrom, wheels on the lower ends of the suspension arms, and means for rotating the other rock shaft.